United States Patent
Shenoy et al.

(10) Patent No.: US 8,808,868 B2
(45) Date of Patent: Aug. 19, 2014

(54) FLUORINATED COPOLYMERS OF (METH)ACRYLATES AND (METH)ACRYLIC ACID AMINE COMPLEXES

(75) Inventors: Siddhartha Shenoy, Wilmington, DE (US); Joel M. Pollino, Elkton, MD (US); Anilkumar Raghavanpillai, Wilmington, DE (US); Brad M. Rosen, Philadelphia, PA (US); John Russell Crompton, Jr., Bear, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 143 days.

(21) Appl. No.: 13/301,041

(22) Filed: Nov. 21, 2011

(65) Prior Publication Data

US 2012/0156515 A1    Jun. 21, 2012

Related U.S. Application Data

(60) Provisional application No. 61/424,245, filed on Dec. 17, 2010.

(51) Int. Cl.
| | | |
|---|---|---|
| B32B 27/30 | (2006.01) | |
| B32B 23/08 | (2006.01) | |
| C08F 220/22 | (2006.01) | |
| C08F 220/28 | (2006.01) | |
| C08F 228/02 | (2006.01) | |
| C08F 230/02 | (2006.01) | |
| C08F 230/08 | (2006.01) | |

(52) U.S. Cl.
USPC ........ 428/514; 428/522; 427/358; 427/427.4; 427/427.6; 427/429; 427/430.1; 427/440; 427/443.2

(58) Field of Classification Search
None
See application file for complete search history.

(56) References Cited

U.S. PATENT DOCUMENTS

| | | | |
|---|---|---|---|
| 3,282,905 A | 11/1966 | Fasick et al. | |
| 3,979,469 A | 9/1976 | Jager | |
| 4,569,965 A | 2/1986 | Engel et al. | |
| 5,481,028 A | 1/1996 | Petrov et al. | |
| 6,037,429 A | 3/2000 | Linert et al. | |
| 6,303,190 B1 | 10/2001 | Linert et al. | |
| 6,465,591 B1 | 10/2002 | Lee | |
| 2007/0178239 A1 | 8/2007 | Kestell et al. | |
| 2007/0197717 A1 | 8/2007 | Ueda et al. | |
| 2010/0261020 A1* | 10/2010 | Fukuda et al. | 428/421 |

FOREIGN PATENT DOCUMENTS

| | | |
|---|---|---|
| CN | 1730502 | 2/2006 |
| CN | 101469148 | 7/2009 |
| EP | 1743910 | 1/2007 |
| EP | 2206735 | 10/2008 |
| FR | 2730736 | 8/1996 |
| FR | 2922447 | 4/2009 |
| JP | 04202382 | 7/1992 |
| JP | 1994239941 | 8/1994 |
| JP | 04153274 | 5/1996 |
| JP | 09279097 | 10/1997 |
| JP | 11256070 | 9/1999 |
| WO | 9511877 | 5/1995 |
| WO | 9700230 | 1/1997 |
| WO | 0006612 | 2/2000 |
| WO | 0119883 | 3/2001 |
| WO | 0136526 | 5/2001 |
| WO | 03018508 | 3/2003 |
| WO | 2005097850 | 10/2005 |

OTHER PUBLICATIONS

Balague et al., Synthesis of fluorinated telomers. Part 1. Telomerization of vinylidene fluoride with perfluoroalkyl iodides, Journal of Fluorine Chemistry, 1995, 70, 215-223, Elesevier.
Honha et al., Molecular Aggregation Structure and Surface Properties of Polyfluoroalkyl acrylate Thin Films, Macromolecules, 2005, 38, 5699-5705, American Chemical Society.

* cited by examiner

*Primary Examiner* — Sheeba Ahmed

(57) ABSTRACT

A stain resistant, oil and water repellent copolymer comprising a copolymer prepared from fluorinated (meth)acrylate and amine salts of (meth)acrylic acid, and a method of providing stain resistance, oil and water repellency to substrates and a treated substrate.

16 Claims, No Drawings

FLUORINATED COPOLYMERS OF (METH)ACRYLATES AND (METH)ACRYLIC ACID AMINE COMPLEXES

FIELD OF THE INVENTION

This invention relates to coating copolymer for stain resistance, oil and water repellency for hard substrates comprising a copolymer of fluorinated (meth)acrylates and amine salts of (meth)acrylic acid.

BACKGROUND OF THE INVENTION

Hard surfaces, such as, stone, masonry, concrete, unglazed tile, brick, porous clay and various other substrates, are used decoratively and functionally in indoor and outdoor environments. When untreated, these materials are susceptible to staining from water, oil, and foodstuffs such as ketchup, mustard, coffee, cooking oils, wine, and beverages. Several products exist in the marketplace for treating these substrates. Stone and tile treatment products are commonly a copolymer containing a fluorinated monomer, for stain release and oil repellency, with a non-fluorinated monomer providing water repellency.

Linert, et al., in WO199700230, describe a composition comprising a fluoroaliphatic groups, carboxyl containing groups, oxyalkene groups and optionally silyl groups which provide repellency to oil- and water-based stains for porous substrates.

Ueda et al., in US20070197717, describe a masonry treating agent comprising fluoromonomer, a monomer having at least one acid group, and a non-fluorinated monomer having a hydrophobic group.

What is needed are self-dispersed coating copolymer that provide superior performance for stain resistance, oil and water repellency to hard substrates. These coating copolymer should have good adhesion properties to the substrates capable of withstanding multiple rinse cycles and still maintain good performance against stains and oil and water repellency. These coating copolymers should be easily produced without adding significant process steps. The present invention meets these needs.

SUMMARY OF THE INVENTION

The present invention comprises a copolymer of formula (I)

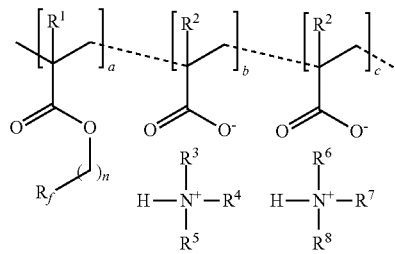

wherein
$R_f$ is $C_2$ to $C_{10}$ fluoroalkyl, optionally interrupted by one or more —O—, —CH$_2$—, —CFH—, or combinations thereof;
n is an integer from 1 to 10;
$R^1$ and $R^2$ are each independently H or CH$_3$;
$R^3$ is H, CH$_3$, or CH$_2$CH$_3$;
$R^4$ is H, CH$_3$, or CH$_2$CH$_3$;
$R^5$ is $C_6$ to $C_{18}$ alkyl or Y;
$R^6$ is H, CH$_3$, or CH$_2$CH$_3$;
$R^7$ is H, CH$_3$, or CH$_2$CH$_3$;
$R^8$ is H, CH$_3$, CH$_2$CH$_3$, or Y;
a is 20 to 60 mol %;
b is 0 to 20 mol %; and
c is 40 to 70 mol %;
provided that (a+b+c) equals 100;
Y is

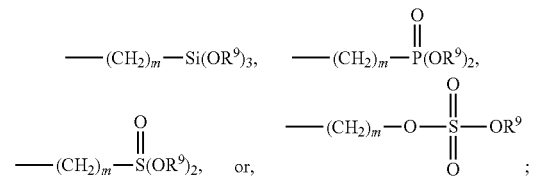

$R^9$ is each independently alkyl, alkyl alcohol, or hydrogen; and
m is 1 to 10.

The present invention further comprises a process to produce copolymers of Formula I.

The present invention further comprises a method of treating a substrate comprising contacting said substrate with a copolymer of Formula I.

The present invention further comprises a substrate treated in accordance as the above mentioned method.

DETAILED DESCRIPTION

Herein, trademarks are shown in upper case.

The term "(meth)acrylic" refers to both methacrylic and acrylic compounds and the term "(meth)acrylate" refer to both a methacrylate and acrylate compounds.

The present invention comprises copolymer of formula (I)

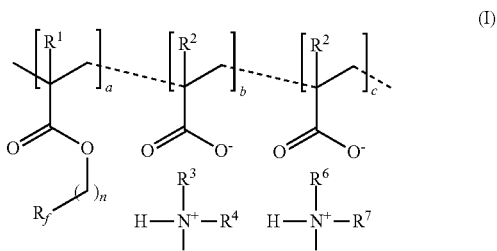

wherein
$R_f$ is $C_2$ to $C_{10}$ fluoroalkyl, optionally interrupted by one or more —O—, —CH$_2$—, —CFH—, or combinations thereof;
n is an integer from 1 to 10;
$R^1$ and $R^2$ are each independently H or CH$_3$;
$R^3$ is H, CH$_3$, or CH$_2$CH$_3$;
$R^4$ is H, CH$_3$, or CH$_2$CH$_3$;
$R^5$ is $C_6$ to $C_{18}$ alkyl or Y;
$R^6$ is H, CH$_3$, or CH$_2$CH$_3$;
$R^7$ is H, CH$_3$, or CH$_2$CH$_3$;
$R^8$ is H, CH$_3$, CH$_2$CH$_3$, or Y;
a is 20 to 60 mol %;
b is 0 to 20 mol %; and
c is 40 to 70 mol %;
provided that (a+b+c) equals 100;

Y is

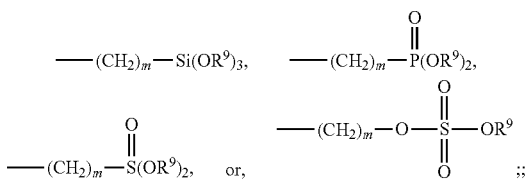

$R^9$ is each independently alkyl, alkyl alcohol, or hydrogen; and m is 1 to 10.

Preferably, $R_f$ is $C_4$ to $C_6$, more preferably $R_f$ is $C_6$. Preferably n is 2 to 6, more preferably n is 2. Preferably a is 30 to 50 mol %, b is 1 to 10 mol % and c is 45 to 65 ml %. Preferably a is 30 to 60 mol %; b is 0 mol %; and c is 40 to 70 mol %, more preferably a is 35 to 45 mol %; b is 0 mol %; and c is 55 to 65 mol %. Preferably, $R^5$ is $C_6$ to $C_{18}$ alkyl, more preferably $R^5$ is $C_{10}$ to $C_{16}$ alkyl, more preferably $R^5$ is $C_{12}$. Preferably, $R^5$ is Y. Preferably Y is —$(CH_2)_m$—Si$(OR^9)_3$. Preferably Y is

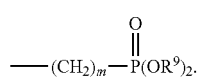

Preferably Y is

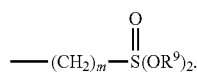

Preferably Y is

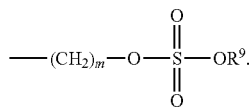

Preferably, Y is a 3-aminopropyl functionalized silica nanoparticle wherein the functionalized nanoparticle is about 100 nm. Preferably, m is 2 to 8, more preferably 2 to 6. Preferably, $R^9$ is each independently alkyl, alkyl alcohol, or hydrogen. Preferably, $R^9$ is hydrogen. Preferably $R^9$ is alkyl alcohol. Preferably, $R^9$ is an alkyl wherein the alkyl is $CH_3$ or $C_2H_5$.

In the present invention, a, b, and c represent the molar percentage of each individual component that is used to prepare the copolymers of the present invention. The copolymers of Formula I are present in a random order of monomers within the copolymer, represented by the dotted lines. The molar percentage of each reactant (a, b, and c) are chosen such that they within the previously specified molar range and the sum of the combined components is equal to 100%. One skilled in the art can easily choose molar percentages for each monomer within the stated ranges so that the total equals 100%. For example, a is any of 20, 21, 22, 23 and so on, up to 60; b is 0, 1, 2, 3, 4, and so on up to 20; and c is 40, 41, 42, 43, 44 and so on up to 70. The combination of any individual value for a is from 20 to 60, any individual value for b is from 0 to 20, and any individual value for c is from 20 to 60, that totals 100 is included within the present invention.

In one embodiment, the copolymers of the present invention are prepared via radical polymerization by contacting fluorinated (meth)acrylate monomers and methacrylate acid monomers together in the presence of a radical initiator to produce a copolymer. This is then followed by a neutralization step with one or more amines to produce the corresponding ammonium salt or salts of (meth)acrylic acid. In a second embodiment, copolymers of the present invention are prepared by contacting a fluorinated (meth)acrylate monomer, (meth)acrylic acid, and one or more amines in the presence of a radical initiator producing a copolymer. In a third embodiment, copolymers of the present invention are prepared by contacting a fluorinated (meth)acrylate monomer, (meth)acrylic acid, and one or more amines in the presence of a radical initiator where the molar amount of amines is less than the molar amount of (meth)acrylic acid producing a copolymer containing fluorinated (meth)acrylate, (meth)acrylic acid, and amine salts of (meth)acrylic acid. In this third embodiment, the corresponding copolymers is then neutralized with one or more amines to produce a corresponding second (meth)acrylic acid salt or salts.

Copolymers of Formula I are prepared via polymerization and are carried out in the presence of one or more radical initiators. The radical initiators are present at 0.1 to 6.0 weight percent relative to the weight of the monomers employed. Initiators which may be used are peroxides such as, for example, benzoyl peroxide, lauroyl peroxide, succinyl peroxide and tert-butyl perpivalate, or azo compounds such as 2,2'-azobisisobutyronitrile, 4,4'-azobis(4-cyanopentanoic acid) and azodicarbonamide. Such azo initiators are commercially available from E. I. du Pont de Nemours and Company, Wilmington, Del., under the name of "VAZO" 67, 52 and 64, and by Wako Pure Industries, Ltd., Osaka, Japan, under the name "V-501". The process may also be performed in the presence of UV radiation and photo-initiators such as benzophenone, 2-methylanthraquinone or 2-chlorothioxanthone.

The reaction temperature varies within a wide range, that is to say between room temperature and the boiling point of the reaction mixture. The process is preferably performed between about 50° and about 90° C.

The fluorinated methacrylate monomers used to prepare copolymer of Formula I are of formula (II)

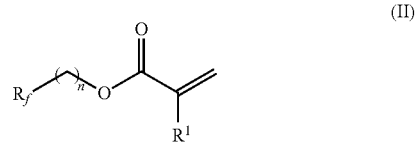

(II)

wherein $R_f$ is $C_2$ to $C_{10}$ fluoroalkyl, optionally interrupted by one or more —O—, —$CH_2$—, —CFH—, or combinations thereof, n is an integer from 1 to 10, and $R^1$ is H or $CH_3$. Examples of $R_f$ include, but not limited to, $CF_3(CF_2)_x$—, $CF_3(CF_2)_x(CH_2CF_2)_y$—, $CF_3(CF_2)_yO(CF_2)_y$—, and $CF_3(CF_2)_yOCFH(CF_2)_z$—, wherein each x is independently 1 to 9, each y is independently 1 to 3, and each z is independently 1 to 4. Preferably, $R_f$ is $C_4$ to $C_8$ fluoroalkyl, more preferably, $R_f$ is $C_6$ fluoroalkyl. Preferably, n is 2 to 6, more preferably n is 2.

Fluorinated (meth)acrylates of Formula (II), are synthesized from the corresponding alcohols. These fluorinated methacrylate compounds are prepared by either esterification of the corresponding alcohol with acrylic acid or methacrylic acid or by transesterification with methyl acrylate or methyl methacrylate. These preparations are well known and are described in U.S. Pat. No. 3,282,905, herein incorporated by reference.

Fluorinated (meth)acrylates useful in the present invention are prepared from alcohols having the formula $CF_3(CF_2)_x(CH_2)_nOH$ wherein each x is independently 1 to 9 and n is 1 to 10, are commercially available from E. I. du Pont de Nemours and Company, Wilmington, Del. These alcohols can also be prepared by reaction of the corresponding perfluoroalkyl iodides with oleum and hydrolyzed according to the procedure described in WO 95/11877, herein incorporated by reference. These alcohols are available as a homologue distribution mixture or are fraction distilled into individual chain lengths.

Fluorinated (meth)acrylates useful in the present invention are prepared from alcohols having the formula $CF_3(CF_2)_y(CH_2CF_2)_p(CH_2)_nOH$ wherein each y is independently 1 to 9, each p is independently 1 to 2, and n is 1 to 10. These alcohols are prepared by the telomerization of perfluoroalkyl iodides with vinylidene fluoride followed by ethylene insertion. A detailed description of the vinylidene fluoride reaction is described in Balague, et al., "Synthesis of Fluorinated telomers, Part 1, Telomerization of vinylidene fluoride with perfluoroalkyl iodides", J. Fluor. Chem. (1995), 70(2), 215-23. Reaction details for the ethylene insertion reaction is described in U.S. Pat. No. 3,979,469. The alcohol are prepared with oleum and hydrolysis as described above.

Fluorinated (meth)acrylates useful in the present invention are prepared from alcohols having the formula $CF_3(CF_2)_yO(CF_2)_y$—$(CH_2)_nOH$ wherein each y is independently 1 to 3 and n is 1 to 10. These alcohols are prepared from the corresponding perfluoroalkyl ether iodides, of formula $CF_3(CF_2)_yO(CF_2)_yI$ wherein each y is independently 1 to 3. These iodides are prepared according to the procedure described in U.S. Pat. No. 5,481,028, hereby incorporated by reference, by reacting a perfluorovinyl ether with ICl/HF and $BF_3$. Ethylene insertion and alcohol conversion is as described above.

The (meth)acrylic acid salts useful in the present invention are prepared by contact the (meth)acrylic acid with one or more amines in a solvent. This contacting of one or more amines to (meth)acrylic acid can occur prior to polymerization, during polymerization, after polymerization has occurred. The (meth)acrylic acid salts can also be prepared in one or more steps. For example, the polymerization can contain monomer repeat units of (meth)acrylic acid and (meth)acrylic acid salts, formed from one or more amines. These (meth)acrylic acid repeat unit monomers can then be neutralized with one or more amines to produced the corresponding salts.

Amines useful in the present invention are those readily capable of forming a salt with (meth)acrylic acid. Amines useful in the present invention have the generic formula $NR_3$ where each R is independently $R^3$, $R^4$, $R^5$, $R^6$, $R^7$, and $R^8$ as defined above. Amines useful in the present invention include, but not limited to, ammonium hydroxide, alkylamines, alkanolamines, alkoxyamines, aminoalkyl sulfates, aminoalkyl sulfonates, aminoalkyl phosphonates, and aminoalkyl silanes. Specific examples of linear amines useful in the present invention include, but are not limited to, ammonium hydroxide, mono-, di-, and trimethylamine, mono-, di-, triethylamine, mono-, di-, and triethanolamines, 2-aminoethanesulfonic acid, 2-aminoethylhydrogen sulfate, dodecylamine and N—N-dimethyldodecylamine, butylamine, hexylamine, heptylamine, octylamine, nonylamine, decylamine, hexadecylamine, dibutylamine, dioctylamine, tripentylamine, tripropylamine, tributylamine, tridodecylamine, 3-methoxypropylamine, N,N-dimethylethyl amine, N,N-dimethylbutylamine, N,N-diethylbutylamine, N-methyldibutylamine, N,N-dimethyl octylamine, N,N-dimethyldodecylamine. Specific examples of branched amines include, but are not limited to, isopropylamine, isobutylamine, tertbutylamine, amylamine, diisopropylamine, diisobutylamine, 3-isopropoxypropylamine, 2-ethylhexylamine. Specific examples of cyclic amines include but are not limited to, cyclopentylamine, cyclohexylamine, cyclodecylamine, 1-adamantylamine, dicyclohexylamine, N,N-dimethylcyclohexylamine. Specific examples of aryl amines include but are not limited to, N,N-diethylaniline, N,N-dimethylbenzylamine, 4-N,N-trimethylaniline, 3-phenyl-1-propylamine. Specific examples of silicone containing amines included but are not limited to, (3-aminopropyl)trimethoxysilane, (3-aminopropyl)triethoxysilane, N,N-dimethylaminopropyl trimethoxysilane, N,N-dimethylaminopropyl triethoxysilane, 3-aminopropyl functionalized silica nanoparticle, (trimethylsilyl)methylamine, N,N-diethyltrimethylsilylamine, 3-(2-aminoethylamino)propyldimethoxymethylsilane, (3-aminopropyl)tris(trimethylsiloxy)silane.

The copolymers of the present invention are preferably in the form of a dispersion. It is preferably employed as an aqueous dispersion.

The present invention further comprises a method of treating a substrate to provide stain resistance, oil and water repellency comprising contacting the substrate surface with a copolymer of Formula I. The copolymers of the present invention are in the form of an aqueous dispersion. The dispersions are added alone or can optionally include additives or treatment agents. The copolymer of the present invention are applied to substrates by known means, including but not limited to, brushing, spraying, rollering, dipping, padding, doctor blade, wipe, dip techniques, and wet-on-wet procedure. Those skilled in the art understand that the type of substrate, i.e., hard surface or textile, will determine the appropriate mode of application. For example, for a hard surface, such as tile, application of copolymer are applied by brushing or spraying. For fibrous substrates, such as cottons or nylons, padding or dipping are chosen to apply the copolymer to the substrate.

The present invention further comprises one or more substrates treated according to the method of the present invention. These substrates comprise hard surface substrates or fibrous substrates. Examples of hard surface substrates include but not limited to unglazed concrete, brick, tile, stone such as limestone and saltillo, grout, mortar, composite materials such as terrazzo, wall and ceiling panels including those fabricated with gypsum board, marble, statuary, monuments, and wood. Suitable fibrous substrates include but not limited to woven and nonwoven fibers, yarns, fabrics, fabric blends, textiles, nonwovens, paper, leather, rugs and carpets. These are made from natural or synthetic fibers including cotton, cellulose, wool, silk, polyamide, polyester, polyolefin, polyacrylonitrile, polypropylene, rayon, nylon, aramid, and acetate. The treated substrates have improved repellency for water, oil and greases and provide protection against staining The copolymer, methods, and treated substrates of the present invention are useful in providing stain resistance and water and oil repellency for a variety of substrates. The copolymer are easily adaptable for a variety of applications.

EXAMPLES

Materials and Test Methods

Application and Testing of Polymers on Stone Tile surface

The copolymers of the present invention were applied as dispersions and tested on limestone and saltillo stone tiles. The stone tiles are wiped with a damp SONTARA wipe (commercially available from E. I. du Pont de Nemours and Company, Wilmington, Del.). The stones dried overnight at room temp and sectioned into 9 equal segments by adhesive tape. Two wt % solutions of the polymer copolymer of the present invention were applied as dispersions to each section using a bristle brush. The amount of polymer applied was determined by taking the weight difference of the polymer stock solution before and after application. Each section was brushed with a dispersion to form one even coat. Typically four main brush passes were used to cover the surface. After 15 minutes, any excess polymer on the surface, was removed by buffing the surface with a wipe. The coating was allowed to dry overnight and then performance evaluated by the test methods described below.

Test Method 1. Water and Oil Beading Test

Individual drops of water and vegetable oil (approximately 4 to 5 mm in diameter or 0.04 to 0.05 mL volume) were placed on the coated surface using a glass pipette. The drop was allowed to sit on the surface for five minutes and the degree of beading (i.e., contact angle) was visually determined. The degree of beading is rated from 0 to 5 as shown in the Table 1 below. Higher ratings are indicative in superior repellency performance.

TABLE 1

Water and Oil Contact Angle Measurments

| Rating | Contact angle (°) | Significance |
|---|---|---|
| 0 | <10 | Penetration of liquid |
| 1 | 10 to 25 | Poor Beading |
| 2 | 25 to 45 | Fair Beading |
| 3 | 45 to 75 | Good Beading |
| 4 | 75 to 90 | Very good Beading |
| 5 | 90 to 120 | Excellent Beading |

Test Method 2. 24-Hour Stain Testing:

One drop each of common household stains (mustard, ketchup, vegetable oil, salad dressing coffee) were individually placed on the treated tile surface and allowed to sit for 24 hours. The stains were removed by washing with water and a nylon bristle brush. The treated stone was allowed to dry at room temperature (72 to 78° F.) until the stone was completely dry (approximately 12 to 24 hours). The stain residue remaining on the tile surface was visually rated from 0 to 4 as follows. Lower rating indicates better performance. Liquid stains that does not leave a visible surface stain but penetrates deep into the substrate are given a rating 4. The stain procedure was repeated 4 times and averaged.

TABLE 2

24-Hour stain ratings.

| Rating | Visual Observation |
|---|---|
| 0 | No stain |
| 1 | Very light stain |
| 2 | Light stain |
| 3 | Moderate stain |
| 4 | Heavy stain or Penetration of liquid stain deep into the substrate |

A stain score aggregate is calculated by adding the sum of all stain scores for a test sample and the performance compared with the total maximum possible score (i.e., for 5 stains, the highest rating is 20).

Test Method 3—Water Repellency Test

The water repellency of saltillo substrates were measured according to AATCC (American Association of Textile Chemists and Colorists) standard Test Method No. 193-2004. The test determined the resistance of the treated substrate to wetting by aqueous test solutions (see Table 3 for Test Solution copolymer). Drops of test solutions (approximately 5 mm in diameter or 0.05 mL volume) of water-alcohol mixtures of varying surface tensions were placed on the treated substrate and the extent of surface wetting was determined visually. Three drops of test solution #1 were placed on the substrate. After 10 seconds, the drops were removed by using vacuum aspiration. If no liquid penetration or partial absorption (appearance of a darker wet patch on the substrate) was observed, the test was repeated with Test Liquid 2 and with progressively higher Test Liquid numbers until liquid penetration (appearance of a darker wet patch on the substrate) was observed. The rating was the highest Test Liquid number that did not penetrate into the substrate. Higher scores indicate greater water repellency and superior performance The composition of water repellency test liquids is shown in the Table 3 below.

TABLE 3

| Test Solution # | Composition, Volume % | | Rating Number |
|---|---|---|---|
| | Isopropyl Alcohol | Distilled Water | |
| 1 | 2 | 98 | 1 |
| 2 | 5 | 95 | 2 |
| 3 | 10 | 90 | 3 |
| 4 | 20 | 80 | 4 |
| 5 | 30 | 70 | 5 |
| 6 | 40 | 60 | 6 |
| 7 | 50 | 50 | 7 |
| 8 | 60 | 40 | 8 |
| 9 | 70 | 30 | 9 |
| 10 | 80 | 20 | 10 |
| 11 | 90 | 10 | 11 |
| 12 | 100 | 0 | 12 |

Test Method 4. Oil Repellency Test

The oil repellency of treated substrates was tested using a modification of AATCC standard Test Method No. 118, and was modified as follows. A series of organic liquids, identified below in the Table 4, were applied drop wise to the substrate. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids results in two of the three drops failed to remain spherical to hemispherical, or wetting or wicking occurs.

The oil repellency rating was the highest numbered test liquid for which two of the three drops remained spherical to hemispherical, with no wicking for 30 seconds. Higher scores indicate greater oil repellency.

TABLE 4

| Rating Number | Test Solution |
|---|---|
| 0 | Fails NUJOL* Purified Mineral Oil |
| 1 | NUJOL* Purified Mineral Oil |
| 2 | 65/35 Nujol ®/n-hexadecane by volume at 21 C. |
| 3 | n-hexadecane |
| 4 | n-tetradecane |
| 5 | n-dodecane |
| 6 | n-decane |
| 7 | n-octane |
| 8 | n-heptane |

*NUJOL (comercially available from Plough, Inc., Memphis, Tennesse) is a mineral oil having a Saybolt viscosity of 360/390 at 38° C. and a specific gravity of 0.880/0.900 at 15° C.

EXAMPLES

Example 1

A copolymer of Formula I was prepared in organic solvent. Perfluoroalkyl methacrylate, having the formula $CF_3(CF_2)_5CH_2CH_2OC(O)C(CH_3)=CH_2$ (10 g, 23.1 mmol), methacrylic acid (3.3 g, 38.4 mmol), (3-aminopropyl)trimethoxysilane (0.14 g, 0.77 mmol), triethylamine (3.8 g, 37.6 mmol) and tetrahydrofuran (THF, 62 g) were added to a nitrogen purged reaction vessel equipped with a magnetic stir bar and condensor. The reaction vessel was then sparged with nitrogen at room temperature (approximately 23° C.) for one hour. The reaction vessel was then heated to 60° C. and initiator (0.27 g in 2 g isopropanol, VAZO 67, commercially available from E. I. du Pont de Nemours and Company, Wilmington, Del.) was added to the reaction flask using a syringe. The temperature of the reaction vessel was raised to 68° C. and held at 68° C. for 20 minutes. The temperature was then reduced to 65° C. and was stirred for 18 hours. The reaction mixture was then cooled to room temperature (23° C.) and solids settled to the bottom of the flask. The liquid supernatant was decanted. The solids were triturated and dissolved into water (90 mL) and combined with the liquid supernatant. This mixture was then reduced in vacuo to 13.5 weight % solids in water. It was further diluted with water and tested according to the test methods described above.

Example 2

Perfluoroalkyl methacrylate, having the formula $CF_3(CF_2)_5CH_2CH_2OC(O)C(CH_3)=CH_2$ (50 g, 115.5 mmol), methacrylic acid (16.5 g, 192 mmol), and tetrahydrofuran (THF, 155 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. and stirred for five minutes. Initiator (1.35 g in 10 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid copolymer as a 33 weight % solids in THF.

The fluorinated methacrylate/methacrylic acid copolymer in THF (23.2 g), (N,N-dimethylaminopropyl)trimethoxysilane (0.1 g, 0.44 mmol), triethylamine (2.2 g, 21.6 mmol), and THF (25 g) were added to a nitrogen purged reaction vessel equipped with a magnetic stir bar and condensor. The reaction mixture was heated to 68° C. and stirred under a nitrogen blanket for two hours. Water (50 mL) was then added and the mixture was stirred for an additional 30 minutes at 68° C. The reaction mixture was then cooled to room temperature. The mixture was concentrated in vacuo to remove residual THF and resulted in a 16.5 weight % solids dispersion in water and tested according to the test methods described above.

Examples 3

The fluorinated methacrylate/methacrylic acid copolymer in THF (25.5 g) prepared above in Example 2,3-aminopropyl functionalized silica nanoparticles (1 g, 3 weight % in ethanol), and THF (25 g) were added to a nitrogen purged reaction vessel equipped with a magnetic stir bar and condensor. The reaction mixture was heated to 68° C. and stirred under a nitrogen blanket for 1 hour. Addition 3-aminopropyl functionalized silica nanoparticles (1 g, 3 weight % in ethanol) was added to the reaction mixture followed by addition of triethylamine (0.9 g, 8.9 mmol). Water (50 mL) was then added and the mixture was stirred for an additional 30 minutes at 68° C. The reaction mixture was then cooled to room temperature. The mixture was concentrated in vacuo to remove residual THF and resulted in a 12.4 weight % solids dispersion in water. It was further diluted with water and tested according to the test methods described above.

Example 4

Perfluoroalkyl methacrylate, having the formula $CF_3(CF_2)_5CH_2CH_2OC(O)C(CH_3)=CH_2$ (10 g, 23.1 mmol), methacrylic acid (16.5 g, 192 mmol), triethylamine (1.9 g, 18.9 mmol), and tetrahydrofuran (28.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/triethylammonium methacrylate salt copolymer as a 30 weight % solids in THF.

To the fluorinated methacrylate/methacrylic acid/triethylammonium methacrylate salt copolymer in THF (28 g), in a nitrogen purged reaction vessel equipped with a magnetic stir bar and condensor were added 2-aminoethanesulfonic acid (1.0 g, 8.1 mmol in 23.2 g water). The reaction mixture was heated to 45° C. and stirred under a nitrogen blanket for one hour. The mixture was concentrated in vacuo to remove residual THF and resulted in a 24.0 weight % solids dispersion in water. It was further diluted with water and tested according to the test methods described above.

Example 5

To the fluorinated methacrylate/methacrylic acid/triethylammonium methacrylate salt copolymer in THF (26 g), as prepared above in Example 4, were were added and 2-aminoethyl hydrogensulfate (1.1 g, 8.1 mmol) in 23.2 g water. The reaction mixture was heated to 68° C. and stirred under a nitrogen blanket for 1 hour. The reaction mixture was then cooled to room temperature. The mixture was concentrated in vacuo to remove residual THF and resulted in a 22.0 weight % solids dispersion in water. It was further diluted with water and tested according to the test methods described above.

Example 6

Perfluoroalkyl methacrylate, having the formula $CF_3(CF_2)_5CH_2CH_2OC(O)C(CH_3)=CH_2$ (10 g, 23.1 mmol), methacrylic acid (2.3 g, 26.9 mmol), 2-aminoethanesulfonic acid (1.0 g, 8.1 mmol), and tetrahydrofuran (28.7 g) were added to a nitrogen purged reaction vessel equipped with a magnetic stir bar and condensor. The reaction vessel was then sparged with nitrogen at room temperature (approximately 23° C.) for one hour. The reaction was then heated to 6° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/methacrylate salt of 2-aminoethanesulfonic acid copolymer as a 30 weight % solids in THF.

Ammonium hydroxide (14.6 M, 3.9 g, 23.1 mmol in water) was then added to the reaction mixture and the reaction mixture was heated to 45° C. and stirred under a nitrogen blanket for one hour. The mixture was cooled to room temperature and concentrated in vacuo to remove residual THF and resulted in a 23.9 weight % solids dispersion in water. It was further diluted with water and tested according to the test methods described above.

Example 7

Perfluoroalkyl methacrylate, having the formula $CF_3(CF_2)_5CH_2CH_2OC(O)C(CH_3)=CH_2$ (10 g, 23.1 mmol), methacrylic acid (2.3 g, 26.9 mmol), N,N-dimethyldecylamine (0.86, 4.65 mmol), and tetrahydrofuran (30.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/N,N-dimethyldecylammonium methacrylate salt copolymer as a 17.4 weight % solids in THF.

The fluorinated methacrylate/methacrylic acid/N,N-dimethyldecylammonium methacrylate salt copolymer in THF (6.6 g) was heated to 45° C. and ammonium hydroxide (14.6 M, 0.81 g in 24.8 g water) was added. The reaction mixture was stirred under a nitrogen blanket for one hour at 45° C. The mixture was concentrated in vacuo to remove residual THF and resulted in a 17.4 weight % solids dispersion in water. It was further diluted with water and tested according to the test methods described above.

Example 8

The fluorinated methacrylate/methacrylic acid/N,N-dimethyldecylammonium methacrylate salt copolymer (6.6 g) prepared in Example 7 was heated to 45° C. in a reaction vessel equipped with a magnetic stir bar and condensor. Triethylamine (1.13 g, 11.1 mmol) was added dropwise to the reaction mixture. The mixture was stirred for one hour at 45° C. Water (24.8 g) was added to the reaction mixture. The mixture was concentrated in vacuo to remove residual THF and resulted in a 19.7 weight % solids dispersion in water. It was further diluted with water and tested according to the test methods described above.

Example 9

Perfluoroalkyl methacrylate, having the formula $CF_3(CF_2)_5CH_2CH_2OC(O)C(CH_3)=CH_2$ (10 g, 23.1 mmol), methacrylic acid (2.3 g, 26.9 mmol), dodecylamine (0.86 g, 4.65 mmol), and tetrahydrofuran (30.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/dodecylammonium methacrylate copolymer as a 30 weight % solids in THF.

The fluorinated methacrylate/methacrylic acid/dodecylammonium methacrylate copolymer (6.6 g in THF) and ammonium hydroxide (14.6 M, 0.81 g, 13.4 mmol in 24.8 g water) were added to a nitrogen purged reaction vessel equipped with a magnetic stir bar and condensor. The reaction mixture was heated to 45° C. and stirred under a nitrogen blanket for one hour. The mixture was concentrated in vacuo to remove residual THF and resulted in a 20.1 weight % solids dispersion in water. It was further diluted with water and tested according to the test methods described above.

Example 10

The fluorinated methacrylate/methacrylic acid/dodecylammonium methacrylate copolymer (6.6 g) prepared in Example 9 was heated to 45° C. in a reaction vessel equipped with a magnetic stir bar and condensor. Triethylamine (1.13 g, 11.1 mmol) was added dropwise to the reaction mixture. The mixture was stirred for one hour at 45° C. Water (24.8 g) was added to the reaction mixture. The mixture was concentrated in vacuo to remove residual THF and resulted in a 22.3 weight % solids dispersion in water. It was further diluted with water and tested according to the test methods described above.

Example 11

Perfluoroalkyl methacrylate, having the formula $CF_3(CF_2)_5CH_2CH_2OC(O)C(CH_3)=CH_2$ (2.5 g, 5.75 mmol), methacrylic acid (0.82 g, 9.6 mmol), diethylaminomethyl phosphonate (0.8 g, 4.8 mmol), and tetrahydrofuran (11.2 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.35 g of VAZO 67 in 0.5 g THF) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/methacrylic acid salt of diethylaminomethyl phosphonate copolymer (28 wt % solids in THF). The copolymer in THF (14.8 g) was heated to 45° C. and ammonium hydroxide (0.290 g (28 wt % $NH_3$), 4.8 mmol) in 24 g water) was added. The reaction was stirred under a nitrogen blanket for one hour at 55° C. The mixture was concentrated in vacuo to remove residual THF and resulted in a 19.4 weight % solids dispersion in water. It was further diluted with water and tested according to the test methods described above.

Examples 1 though 11 were applied to saltillo surfaces and tested according to Test Method 1, Oil and Water Beading, Test Method 2, 24-Hour Stain Test, Test Method 3, Water repellency, and Test Method 4, Oil Repellency according to the methods as described in above. Untreated saltillo was also tested as a comparison. Results are listed below in Table 5 for Water and Oil Beading, Table 6 for Stain Test results, and Table 7 for Test Methods 3 and 4 Oil and Water Repellency results.

TABLE 5

Stone and Tile Oil and Water Beading Scores (rating 0 to 5, 5 is best), Saltillo

| Example | Oil Beading | Water Beading |
| --- | --- | --- |
| Control | 0 | 0 |
| Example 1 | 4 | 4 |
| Example 2 | 5 | 5 |
| Example 3 | 2 | 3 |
| Example 4 | 4 | 4 |
| Example 5 | 5 | 5 |
| Example 6 | 3 | 3 |
| Example 7 | 3 | 3 |
| Example 8 | 3 | 3 |
| Example 9 | 3 | 3 |
| Example 10 | 4 | 4 |
| Example 11 | 3 | 3 |

Examples 1 through 11 performed well when applied to saltillo surfaces compared to untreated saltillo.

TABLE 6

Stain Scoring (rating 0-4, 0 best, 4 worst or represent deep stain penetration), Saltillo

| Examples | Mustard | Ketchup | Veg. Oil | Dressing | Coffee | Total |
| --- | --- | --- | --- | --- | --- | --- |
| Control | 3 | 3 | 4 | 4 | 4* | 18 |
| Example 1 | 2 | 0 | 2 | 1 | 0 | 5 |
| Example 2 | 2 | 3 | 3 | 3 | 1 | 12 |
| Example 3 | 3 | 2 | 1 | 3 | 2 | 11 |
| Example 4 | 1 | 1 | 0 | 0 | 3 | 5 |
| Example 5 | 2 | 2 | 0 | 1 | 3 | 8 |
| Example 6 | 2 | 1 | 0 | 2 | 3 | 8 |
| Example 7 | 0 | 0 | 0 | 0 | 0 | 0 |
| Example 8 | 1 | 1 | 1 | 1 | 1 | 5 |
| Example 9 | 0 | 0 | 0 | 0 | 0 | 0 |
| Example 10 | 0 | 0 | 0 | 0 | 0 | 0 |
| Example 11 | 1 | 1 | 0 | 1 | 0 | 3 |

*represent deep penetration of stain to the substrate

Examples 1 through 11 performed well when applied to saltillo surfaces for stain resistance. In Examples 7, 8, and 9, no visible stain remained after testing.

TABLE 7

Stone and Tile Teflon Kit Test Scores (Water: rating 0-12, 12 is best; Oil: 0-8, 8 is best), Saltillo

| Example | Water Kit Test | Oil Kit Test |
| --- | --- | --- |
| Control | 0 | 0 |
| Example 1 | 10 | 4 |

TABLE 7-continued

Stone and Tile Teflon Kit Test Scores (Water: rating 0-12, 12 is best; Oil: 0-8, 8 is best), Saltillo

| Example | Water Kit Test | Oil Kit Test |
| --- | --- | --- |
| Example 2 | 5 | 4 |
| Example 3 | 6 | 6 |
| Example 4 | 9 | 6 |
| Example 5 | 8 | 5 |
| Example 6 | 9 | 6 |
| Example 7 | 10 | 6 |
| Example 8 | 11 | 6 |
| Example 9 | 10 | 6 |
| Example 10 | 10 | 6 |
| Example 11 | 6 | 3 |

Examples 1 through 11 performed well when applied to Saltillo surfaces when compared to untreated for oil and water repellency.

What is claimed is:

1. A copolymer comprising formula (I)

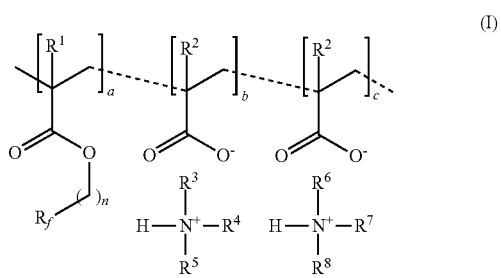

wherein $R_f$ is $C_4$ to $C_6$ fluoroalkyl, optionally interrupted by one or more —O—, —$CH_2$—, —CFH—, or combinations thereof;

n is an integer from 1 to 10;

$R^1$ and $R^2$ are each independently H or $CH_3$;

$R^3$ is H, $CH_3$, or $CH_2CH_3$;

$R^4$ is H, $CH_3$, or $CH_2CH_3$;

$R^5$ is $C_6$ to $C_{18}$ alkyl or Y;

$R^6$ is H, $CH_3$, or $CH_2CH_3$;

$R^7$ is H, $CH_3$, or $CH_2CH_3$;

$R^8$ is H, $CH_3$, $CH_2CH_3$, or Y;

wherein a, b, and c are defined such that either a is 30 to 50 mol %, b is 1 to 10 mol %, and c is 45 to 65 mol %; or a is 35 to 45 mol %, b is 0 mol %, and c is 55 to 65 mol %; provided that (a+b+c) equals 100;

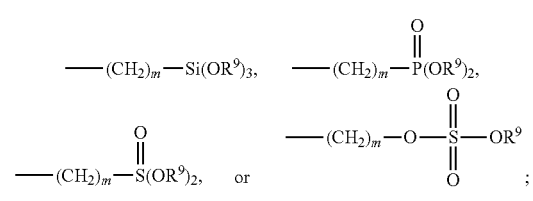

Y is $R^9$ is each independently alkyl, alkyl alcohol, or hydrogen; and m is 1 to 10.

2. A copolymer of claim 1, wherein $R^5$ is $C_6$ to $C_{18}$ alkyl.
3. A copolymer of claim 1, wherein $R^5$ is Y, wherein Y is

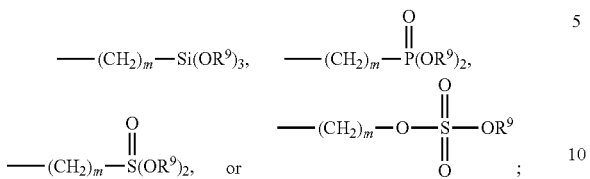

$R^9$ is each independently alkyl, alkyl alcohol, or hydrogen; and m is 1 to 10.

4. A copolymer of claim 3, wherein each $R^9$ is hydrogen.
5. A copolymer of claim 3, wherein each $R^9$ is independently an alkyl.
6. A copolymer of claim 1, wherein $R^5$ is $C_6$ to $C_{18}$ alkyl; $R^8$ is Y, wherein Y is

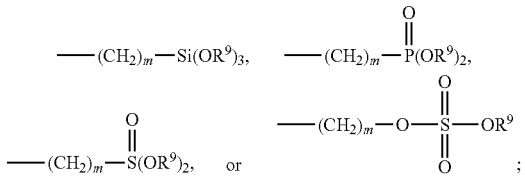

$R^9$ is each independently alkyl, alkyl alcohol, or hydrogen; and m is 1 to 10.

7. A copolymer of claim 6, wherein $R^5$ is $C_6$ to $C_{18}$ alkyl; $R^8$ is Y, wherein Y is —$(CH_2)_m$—$Si(OR^9)_3$; $R^9$ is each independenly alkyl, alcohol, or hydrogen; and m is 1 to 10.

8. A copolymer of claim 6, wherein Y is

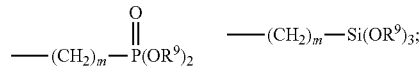

$R^9$ is each independently alkyl, alkyl alcohol, or hydrogen; and m is 1 to 10.

9. A copolymer of claim 6, wherein Y is

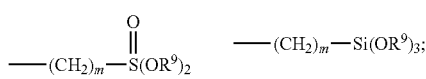

$R^9$ is each independently alkyl, alkyl alcohol, or hydrogen; and m is 1 to 10.

10. A copolymer of claim 6, wherein Y is

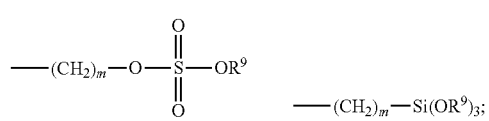

$R^9$ is each independently alkyl, alkyl alcohol, or hydrogen; and m is 1 to 10.

11. A copolymer of claim 1, wherein the copolymer is in the form of a dispersion.

12. A method of providing water repellency, oil repellency and stain resistance to a substrate surface comprising contacting the substrate surface with a copolymer of Formula (I)

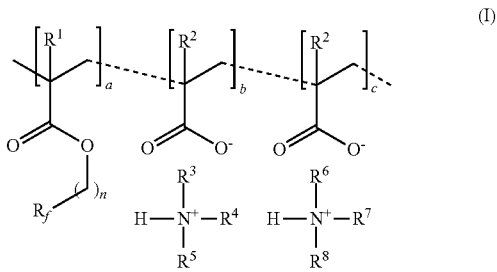

wherein
$R_f$ is $C_4$ to $C_6$ fluoroalkyl, optionally interrupted by one or more —O—, —$CH_2$—, —CFH—, or combinations thereof;
n is an integer from 1 to 10;
$R^1$ and $R^2$ are each independently H or $CH_3$;
$R^3$ is H, $CH_3$, or $CH_2CH_3$;
$R^4$ is H, $CH_3$, or $CH_2CH_3$;
$R^5$ is $C_6$ to $C_{18}$ alkyl or Y;
$R^6$ is H, $CH_3$, or $CH_2CH_3$;
$R^7$ is H, $CH_3$, or $CH_2CH_3$;
$R^8$ is H, $CH_3$, $CH_2CH_3$, or Y;
wherein a, b, and c are defined such that either
a is 30 to 50 mol %, b is 1 to 10 mol %, and c is 45 to 65 mol %; or
a is 35 to 45 mol %, b is 0 mol %, and c is 55 to 65 mol %;
provided that (a+b+c) equals 100;
Y is

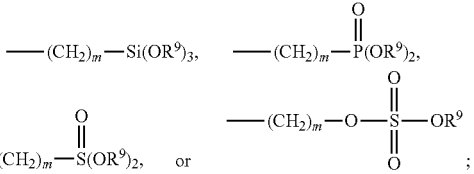

$R^9$ is each independently alkyl, alkyl alcohol, or hydrogen; and m is 1 to 10.

13. A method of claim 12 wherein the copolymer of Formula I is in the form of an aqueous dispersion.

14. A method of claim 12 wherein the contacting is by brushing, spraying, rollering, dipping, padding, doctor blade, wipe, dip techniques, or wet-on-wet procedure.

15. A method of claim 12 wherein the substrate is unglazed concrete, brick, tile, stone, grout, mortar, composite materials, gypsum board, marble, statuary, monuments, or wood.

16. A substrate treated with a method of claim 12, which is unglazed concrete, brick, tile, stone, grout, mortar, composite materials, gypsum board, marble, statuary, monuments, or wood.

* * * * *